United States Patent

Wyke et al.

[11] Patent Number: 5,458,438
[45] Date of Patent: Oct. 17, 1995

[54] INSULATING PIPE SPACERS

[75] Inventors: Richard L. Wyke, Missouri City; James H. McBrien, Houston, both of Tex.

[73] Assignee: Foam Enterprises, Inc., Minneapolis, Minn.

[21] Appl. No.: 50,980

[22] Filed: Apr. 21, 1993

Related U.S. Application Data

[62] Division of Ser. No. 755,818, Sep. 6, 1991, abandoned.

[51] Int. Cl.$^6$ .................................. F16L 1/00; F16L 3/00
[52] U.S. Cl. ....................... 405/154; 138/110; 174/138 G
[58] Field of Search ...................... 138/113, 111, 138/103, 108, 110, 148; 174/99 R, 110 F, 138 G, 138 E; 405/154, 184

[56] References Cited

U.S. PATENT DOCUMENTS

| | | | |
|---|---|---|---|
| 683,521 | 10/1901 | Teuscher | 285/137.1 |
| 2,153,787 | 4/1939 | Anderson | 138/108 |
| 2,739,362 | 3/1956 | Young | 138/103 |
| 3,307,590 | 3/1967 | Carlson | 138/113 |
| 3,427,393 | 2/1969 | Masterson | 174/110 F |
| 3,643,005 | 2/1972 | Mathews | 138/113 |
| 3,762,447 | 10/1973 | Holland | 138/113 |
| 3,790,695 | 2/1974 | Floessel et al. | 174/110 F |
| 3,909,885 | 10/1975 | Sinko | 138/113 |
| 4,043,333 | 8/1977 | Munsch | 138/103 |
| 4,193,105 | 3/1980 | Graafmann | 174/110 F |
| 4,484,785 | 11/1984 | Jackson | 138/112 |
| 4,487,230 | 12/1984 | Anthony | 138/103 |
| 5,069,255 | 12/1991 | Muszynski | 138/113 |

FOREIGN PATENT DOCUMENTS

| | | | |
|---|---|---|---|
| 2718629 | 11/1978 | Germany | 138/106 |
| 0027438 | 6/1983 | Japan | 138/106 |
| 8000495 | 8/1981 | Netherlands | 138/113 |

*Primary Examiner*—John A. Ricci
*Attorney, Agent, or Firm*—Conley, Rose & Tayon

[57] ABSTRACT

Cylindrical spacers molded in place on a pipe or plurality of pipes to be installed in a casing, the spacers being made of a material which adheres to the pipe but has a low coefficient of friction with the casing, so the spacer will stay in place when the pipe is slid longitudinally in the casing.

2 Claims, 1 Drawing Sheet

5,458,438

INSULATING PIPE SPACERS

This is a divisional of application Ser. No. 07/755,818 filed on Sep. 6, 1991, now abandoned.

This invention relates to spacers to keep parallel pipes separated and electrically insulated from each other.

BACKGROUND OF THE INVENTION

In many situations, bundles of parallel pipes are installed and it is necessary or desirable to keep the pipes from contacting each other. In one typical installation, one or more pipes are installed inside an underground or underwater conduit and the pipes must be separated from each other to prevent galvanic corrosion. In the past, such separation has been achieved by means of spacers on the pipes which hold the pipes apart. Such spacers have either been made in two pieces which are clamped together around the pipe, or in a single piece which is slipped over the end of the pipe and then moved down the pipe to the place where the separation is required. These one piece spacers are usually made of rubber or other elastomeric material which has a relatively high coefficient of friction with the pipe. In some cases, it is necessary to pull a pipe on which such spacers are mounted thousands of feet through a casing to the final installation so it is important to be sure that all of the spacers stay in place to maintain the separation between the pipes. The high coefficient of friction between the spacer and the pipe works to hold the spacer in place on the pipe, but also works to apply a longitudinal force due to frictional force exerted by its engagement with the casing. Because of this, when the pipe is pulled through the casing it is not possible to know whether the spacers have stayed in place.

SUMMARY OF THE INVENTION

It is an object of the present invention to provide spacers which are easily applied to the pipe at a desired location and which exhibit a high resistance to movement along the pipe, but provide a low coefficient of friction with a surrounding or adjacent casing or other pipe, so that the pipe having the spacers mounted on it can slide easily through a casing without causing the spacers to move longitudinally on the pipe.

According to this invention, such object is attained by molding a spacer in place at the desired location on the pipe, the spacer preferably being made of a polyurethane or a polyurea which is fast curing and has a high adhesion to the pipe, and a comparatively low coefficient of friction with a surrounding or adjacent pipe.

DESCRIPTION OF THE PREFERRED EMBODIMENTS

Figures 1, 2:
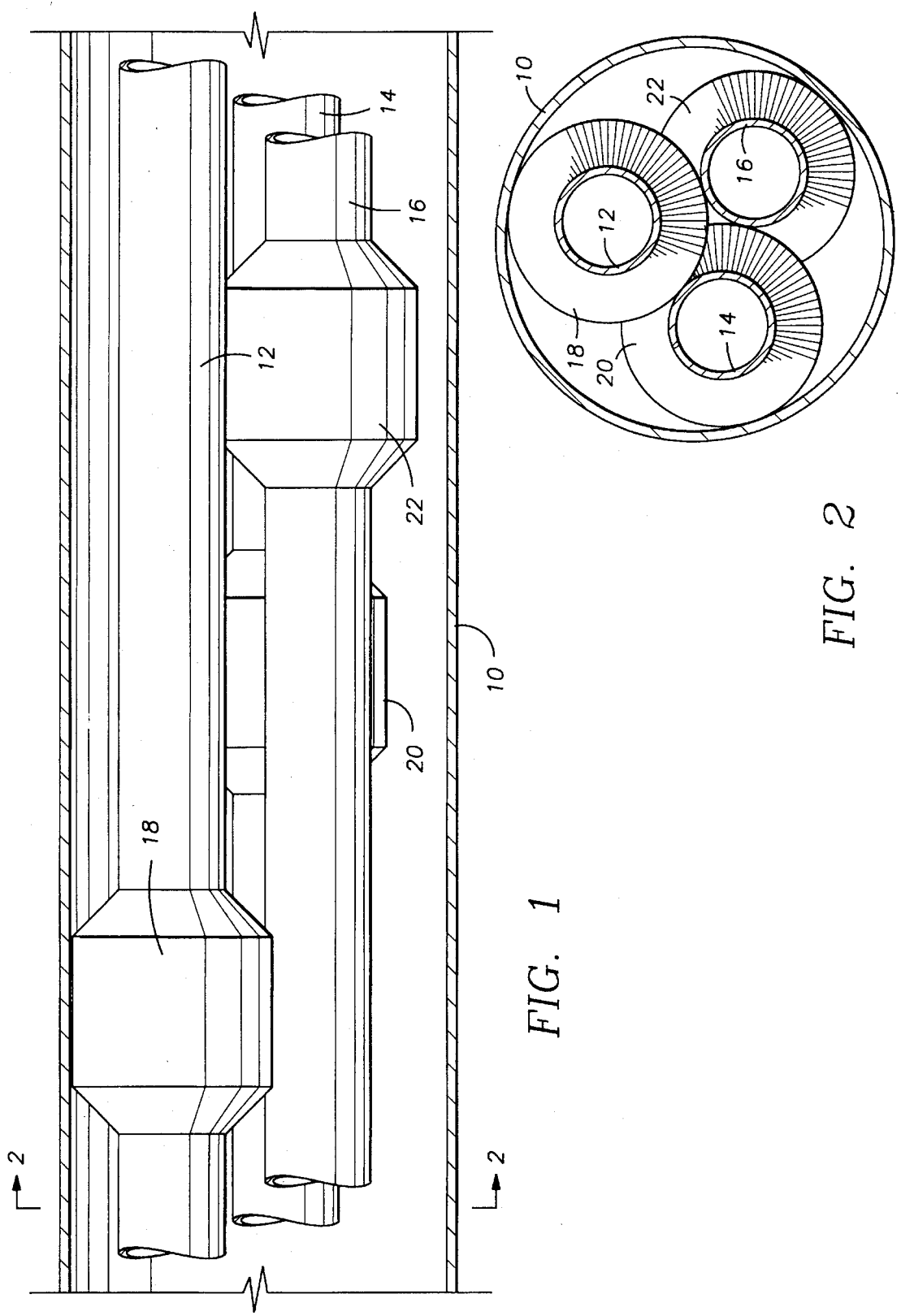
FIG. 1 is a fragmentary view of a portion of a bundle of pipes in a casing having mounted thereon spacers according to one embodiment of this invention.
FIG. 2 is a cross-sectional view of the casing and pipes shown in FIG. 1, taken at line 2—2 of FIG. 1.

In FIG. 1 of the drawing, there is shown a casing or conduit 10 such as might be installed underground or underwater to carry a plurality of pipes therethrough. In the drawing, the casing is shown as containing three parallel pipes 12, 14 and 16. Mounted on the pipes are spacers 18, 20 and 22 respectively. According to this invention, these spacers are molded on the pipe in the position that they are intended to stay, since the molded material adheres to the pipe. As shown, the spacers are provided with cylindrical center sections and tapered ends.

According to this invention the spacer is made of a fast setting elastomeric polymer which will set up in a few minutes so that the pipe can be handled without fear of damage to the spacer. Preferred polymers are rapid setting solid polyurethanes, as for example those prepared by the reaction of the polyhydroxyl containing compounds and the organic polyisocyanates described in U.S. Pat. Nos. 3,983,064, 4,154,716 and 4,246,363, the disclosures of which are incorporated herein by reference. Other suitable polymers include the rapid setting polyureas, for example those prepared by the reaction of amine terminated polyethers and the organic polyisocyanates described in U.S. Pat. No. 4,474,900. The composition preferably also includes a liquid modifier, such as those described in the aforesaid patents. In addition, the composition preferably includes a liquid organic carbonate, and a sufficient amount of one or more catalysts to insure that the composition will set up in not more than about five minutes.

In the preparation of the polyurethanes preferred for use in this invention, an amine initiated polyol is used and more preferably a polyol is selected which has a hydroxyl number in the range of about 600 to about 900 and a minimum functionality of 4. One such material which can be obtained from Dow Chemical Company at Freeport, Texas is sold under the trademark Voranol 800 and is the product of reacting ethylene diamine with 3 parts of propylene oxide and one part of ethylene oxide.

The polymeric isocyanate used is preferably one which has a high vapor pressure for safety purposes. Dow Chemical Company sells a suitable material under the trademark PAPI 27 which is a crude polymeric isocyanate containing some methylene bis phenyl isocyanate and 50–60% polyethylene polyphenyl isocyanate.

The liquid modifier used is preferably a heavy aromatic solvent naphtha consisting primarily of C9 to C11 aromatic hydrocarbons. Such a product is available from Shell Chemical Company under the designation SC150 Solvent.

The liquid organic carbonate used may be one of those described in U.S. Pat. No. 4,154,716. Propylene carbonate has been found to give good results. The organic carbonates are known as plasticizers, and in the composition of this invention they reduce the propensity of the composition to shrink as it cures, and therefore reduces the tendency of the product to crack under stresses produced during curing. Other plasticizers which have been tried do not produce this advantageous result.

The reactants for preparing the composition of the invention are preferably prepared as two components. Component A consists of the polymeric isocyanate combined with the liquid modifier and a liquid organic carbonate. Component B consists of the polyhydroxyl compound, in the case of polyurethanes, or the amine terminated polyether, in the case of polyureas, combined with the liquid modifier and a small percentage of the liquid organic carbonate, together with an amount of catalyst sufficient to insure that the composition will set up in no more than about five minutes.

The catalyst used may be any of the well known catalysts for polyurethane and polyurea. A number of such catalysts are described in U.S. Pat. No. 4,246,363. The preferred catalyst for the polyurethane compositions of this invention are approximately 0.1% to about 0.5% by weight of a 1–2 mixture of triethylene diamine and dipropylene glycol together with about 0.01% to about 0.04% of an alkyl tin mercaptide such as that sold by Witco Chemical Company as their UL-22 catalyst.

The ingredients of Components A and B are mixed separately and held at essentially ambient temperature until ready for use, although they should be protected from extreme cold or extreme heat, because temperature affects the speed of reaction. In use, the two components are mixed, preferably in a blending valve, as they are pumped into the mold where the product of the invention is to be made. The use of such a blending valve is described in a copending patent application Ser. No. 07/715,363, filed Jun. 14, 1991, entitled *"Anode Protector"*, now U.S. Pat. No. 5,164,058, issued Nov. 17, 1992, assigned to the same assignee as the present application.

Example

Component A is prepared by mixing 60 pounds of a polyisocyanate sold under the trademark PAPI 27 by Dow Chemical Company, 30 pounds of a heavy aromatic naphtha sold under the designation SC-150 by the Shell Chemical Company, and 10 pounds of propylene carbonate. Component B is prepared by mixing 31 pounds of Dow Chemical Company's Voranol 800, 64 pounds of the aromatic naphtha, 5 pounds of propylene carbonate, 0.08 pounds of a catalyst consisting of ⅓ triethylenediamine and ⅔ dipropylene glycol, and 0.002 pounds of an alkyl tin mercaptide sold by Witco Chemical Company under the designation UL-22 catalyst. The two components are kept separate from each other until they are to be used, and are kept at atmospheric temperature. When the product is to be molded, separate pumps are used to pump the components into a mixing valve, where they are mixed together and then fed into a mold made of polyethylene sheet, until the mold is filled. After a wait of five minutes, the mold is removed, leaving a solid polyurethane spacer which is highly resistant to injury from sharp blows, and is also securely adhered to the pipe.

If desired, a sheet of reinforcing material, such as a mat of glass fiber, may be wrapped around the pipe before the mold is installed on the pipe. A further sheet of reinforcing material may be applied around the interior surface of the mold. The mold may be made of polyethylene, polypropylene, or any of the other suitable demoldable materials such as those described in U.S. Pat. No. 3,983,064. Alternatively, the mold may be made in two pieces from sheet steel, hinged together and clamped around the pipe. The mold should have an opening at the top into which the mixed components A and B may be poured. To reduce the volume of costly reactants required, the mold may be filled with a granular filler material before components A and B are added. The unreacted material of this invention has a viscosity low enough, usually below 100 centipoises, that it will readily flow between the granules. To expel all the air from the mold when a granular filler material is used, the reaction mixture is fed to the bottom of the mold through a tube extending from the top, with the tube being gradually withdrawn as the mold is filled.

A steel mold will require a release agent, such as wax or oil, to prevent it from sticking to the molded spacer. Preferably, a sheet of corrugated paperboard is used instead of a mold release agent. The paperboard is fitted within the steel mold so that the polyurethane composition is prevented from contacting the mold. The polyurethane adheres to the paperboard, which may be left on the completed spacer.

When the mold is in place, the two components A and B are then pumped through and mixed within the valve and the mixture deposited through an opening in the top of the mold until it has been filled to the top. After the mold is filled, the composition will set in a very short time, preferably not over about 5 minutes, and the mold can then be removed, Because the polyurethane has a high adhesive strength on the steel pipe, but the hardened polymer has a relatively low coefficient of friction with the casing, the pipe may be slid longitudinally along the ground or through a casing or conduit without fear of the spacer sliding along the pipe. The tapered ends of the spacer also facilitate such sliding.

When three or more parallel pipes are to be installed, the spacers are spaced longitudinally, as shown in FIG. 1, so they will not interfere with each other.

Although specific embodiments of the invention have been shown and described, the invention is not limited to those embodiments, but instead extends to all variations which are included within the scope of the following claims.

We claim:

1. A method for installing a plurality of closely adjacent parallel pipes in an installation in which the pipes must be pulled longitudinally with their axes substantially horizontal, comprising molding in place on at least one of said pipes a plurality of rigid spacers longitudinally spaced apart on said one pipe, each of said spacers being made of a composition selected from the group consisting of polyurethanes and polyureas which cure in no more than about five minutes and adhere to said one pipe as they are curing, and the cured outer surfaces of which have a low coefficient of friction with adjacent pipes, placing a plurality of pipes with their axes substantially horizontal and parallel, with said one pipe being positioned so that the outer surface of at least one of the spacers engages at least one other pipe, pulling said one pipe longitudinally and substantially horizontally relative to an adjacent pipe whereby the spacers slide along the surface of the adjacent pipe and frictional force on the spacers will not cause them to be longitudinally displaced on said one pipe.

2. The method according to claim 1, wherein the composition used in the molding step is unfoamed.

\* \* \* \* \*